May 20, 1969 N. LANE 3,445,118

CARTRIDGE HOLDER FOR THE PICK-UP ARM OF A RECORDER PLAYER

Filed Feb. 23, 1968 Sheet 1 of 2

Inventor
NORMAN LANE

By Kurt Kelman
AGENT

May 20, 1969 N. LANE 3,445,118

CARTRIDGE HOLDER FOR THE PICK-UP ARM OF A RECORDER PLAYER

Filed Feb. 23, 1968 Sheet 2 of 2

*Inventor*
NORMAN LANE
By Kurt Kelman
AGENT

United States Patent Office 3,445,118 Patented May 20, 1969

3,445,118
CARTRIDGE HOLDER FOR THE PICK-UP ARM OF A RECORD PLAYER

Norman Lane, Halesowen, England, assignor to BSR Limited, Cradley Heath, Warley, England, a British company Filed Feb. 23, 1968, Ser. No. 707,547
Claims priority, application Great Britain, Mar. 31, 1967, 14,808/67
Int. Cl. G11b *3/10*
U.S. Cl. 274—24 5 Claims

ABSTRACT OF THE DISCLOSURE

A two-part holder for detachably mounting a cartridge on the pick-up arm of a record player, the two parts being each of generally planar form and detachably connected together in face to face relationship and each part having on its face which is opposed to the other part a set of electrical terminal pieces, so that when the two parts are connected together in face to face relationship the two sets of terminal pieces make electrical contact. One part of the holder is adapted to be fixed to the end of the pick-up arm and the terminal pieces thereof are electrically connected to the leads passing along the pick-up arm whilst the other part of the holder has a cradle in which the cartridge is detachably mounted and the terminal pieces of this part of the holder are electrically connected to the output terminals of the cartridge.

BACKGROUND OF THE INVENTION

*Field of the invention*

This invention relates to the pick-up arm of a disc record player and is concerned with means for detachably mounting the cartridge on the end of the pick-up arm. The "cartridge" is the term, well known in this industry, for describing the unitary assembly of stylus, transducer element or elements, and output terminals which are to be connected to leads extending along the length of the pick-up arm.

There is a demand today, particularly among enthusiasts, for a pick-up arm and cartridge assembly in which one cartridge can be exchanged for another of different characteristics in a very simple and rapid manner. For optimum reproduction of sound, different types of records may require the use of cartridges of different characteristics and many users require a simple arrangement for rapidly changing from one cartridge to another.

*Description of the prior art*

In one prior proposal for a detachable cartridge holder, the cartridge has been secured within a housing, by means of screws, and the housing slidably engaged with the end of the pick-up arm and also having, projecting from one end, two pin-like terminal members and a third locating pin, whilst within the tone arm there are fixed socket members to co-operate with the pin-like members to form an electrical connection and a further locating socket member to co-operate with the locating pin, so that the cartridge in its housing can be removed by being slidden out of the pick-up arm and the pins and sockets achieve the electrical connection between the output terminals of the cartridge and the electrical leads extending along the pick-up arm.

The object of the present invention is to provide an improved form of holder for a cartridge which is of more simplified form taking up less space and lighter in weight and is easy to manipulate for the purpose of removing a cartridge and replacing it with another cartridge.

SUMMARY OF THE INVENTION

According to the invention there is provided a holder for detachably mounting a cartridge on the pick-up arm of a record player, said holder being in two parts and comprising a first part of generally planar form adapted for fixing to the pick-up arm and a second part of generally planar form adapted to have the cartridge mounted thereon, the two parts being arranged to be detachably connected together in face to face relationship, said first part having terminal pieces in the face thereof which is opposed to the second part and which terminal pieces are adapted for connection to the leads in the pick-up arm and said second part having terminal pieces in the face thereof which is opposed to the first part and which terminal pieces are adapted for connection to the output terminals of the cartridge, the arrangement being that when said second part is engaged with said first part the terminal pieces on the two parts are brought into electrical contact so as to electrically connect the output terminals of the cartridge to the appropirate leads in the pick-up arm.

Conveniently said two parts of the holder may be made as mouldings in a suitable plastics material, or materials, and at least one of the parts may have a resilient member for snap engagement by the other part whereby the two parts of the holder may be constructed so as to have snap-in and snap-out engagement and disengagement respectively.

BRIEF DESCRIPTION OF THE DRAWINGS

An embodiment of the invention is tnow described in more detail with reference to the accompanying drawings wherein.

DESCRIPTION OF THE PREFERRED EMBODIMENT

Figure 1:
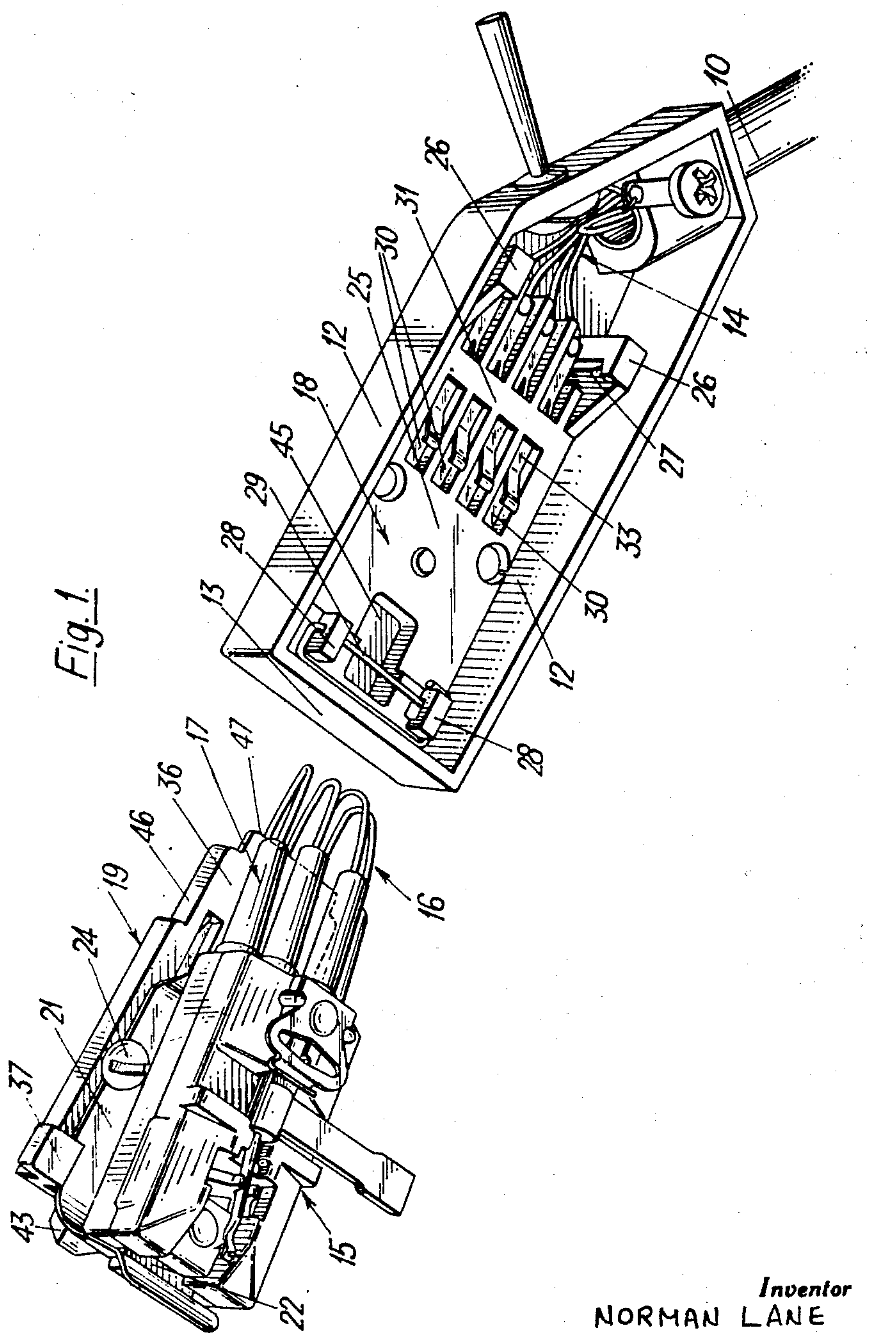
FIGURE 1 is an exploded view looking from the under side of the end of a pick-up arm and showing one part of the holder secured in the pick-up arm and the other part carrying the cartridge detached therefrom.

The pick-up arm which is not shown in full is of generally known form and comprises a tubular arm 10 having at its end a housing of generally rectangular form and comprising a top wall 11, side walls 12 and an end wall 13. The various leads indicated collectively at 14 are shown as passing through the tubular arm 10 for connection to the appropriate terminals of the holder which carries the cartridge, indicated generally at 15. The leads from the holder to the cartridge 15, indicated generally at 16, are adapted to be detachably connected to the cartridge by means of the terminals indicated collectively at 17. Otherwise the construction and type of cartridge used is no part of the present invention and thus a detailed description of the cartridge is not necessary as this may take any of the known forms at present available.

Figure 2:
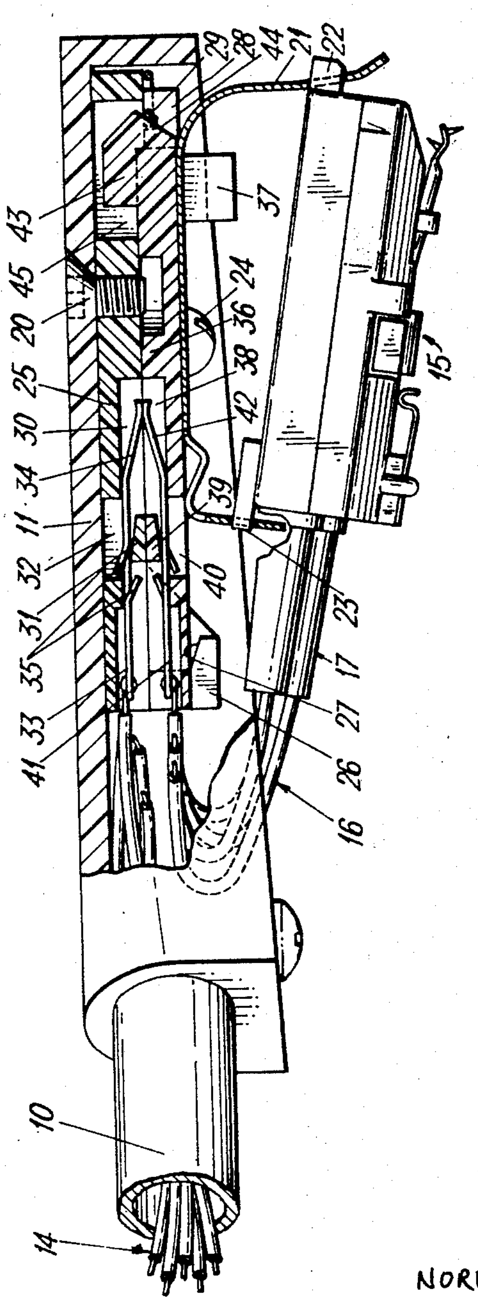
FIGURE 2 is a view of the end of the pick-up arm partly in section and showing the two parts of the holder engaged together with a cartridge in position.

The first part of the holder, which is secured to the housing at the end of the pick-up arm is indicated generally at 18 in FIGURE 1 and, as will be seen from FIGURE 2, is secured to the upper wall 11 of the housing by means of the screw 20. The second part of the holder is indicated generally at 19 in FIGURE 1, and carries detachably the cartridge 15. Any convenient means may be employed for detachably securing the cartridge 15 to this second part 19 of the holder such as that shown which comprises the cradle 21 made of spring strip metal and having the cartridge 15 detachably engaged therein by means of the lugs 22 and 23 at opposite ends of the cartridge engaging in slots in the arms of the strip 21 so that by flexing these parts of the strip outwardly the cartridge 15 can be easily removed from the cradle and a fresh cartridge inserted. The cradle 21 is held in place on the second part of the holder, indicated at 19, by means of screws 24 disposed one at each side of the cradle.

The first part 18 of the holder is of generally planar form and conveniently made as a moulding in plastics material and for the major part comprises a substantially flat base 25. At one end of the base 25 and on each side edge thereof there is formed integrally with the base 25 an upstanding pillar 26 and each such pillar 26 has on its inner face an undercut part 27 whilst at the opposite end of the base 25 there are provided two upstanding blocks 28 spaced apart transversely of the base 25 and forming supports for a resilient catch member in the form of a piece of spring wire 29 which is looped around the blocks 28 and passes therethrough so as to provide a straight portion of spring wire 29 extending between the two blocks 28, as shown particularly in FIGURE 1, and adapted to serve as a resilient catch for retention of the second part 19 of the holder in detachable engagement with the first part 18 as described more particularly hereinafter.

The base 25 of the first part of the holder has formed therein a number of channels 30 (there being four shown in this example) and these channels 30 extend in spaced parallel relationship longitudinally of the base 25 from a position substantially midway along the length thereof to the end of the base 25 at which the connection is made to the leads 14. Substantially midway along the length of the channels 30 a bridge piece 31 extends across the upper open sides of the channels and in a position substantially below the bridge piece 31 there is formed an opening 32 in the base 25 of this first part of the holder.

In each of the channels 30 there is disposed a terminal piece which is in the form of a strip of spring metal 33 having at its inner end a part 34 which is bent so as to be inclined in a direction towards the other part of the holder, as shown in the assembly in FIGURE 2 and which intermediate its ends has lugs 35 pressed out of opposite sides of the strip so as to locate the strip in position by engagement of these lugs with the bridge piece 31 and the rearward side of the aperture 32 in the base of this part of the holder.

At its outer end each strip 33 is electrically connected to an appropriate one of the leads 14.

Referring now to the second part of the holder, this comprises a substantially planar member also preferably moulded in a suitable plastics material and comprising a generally planar base 36 having at its forward end at each side an upwardly projecting lug 37 between which lugs the cradle 21 which holds the cartridge 15 is located in the transverse direction. Similar to the first part of the holder this second part also has channels shown at 38 in the base 36, such channels extending in spaced parallel relationship and there being similarly a bridge piece 39 extending across the open upper sides of the channels substantially midway between their ends with an aperture 40 in the base 36 substantially below the bridge piece 39 and the channels 38 are positioned in the base 36 so that when the two parts of the holder are brought together in face to face relationship as shown in FIGURE 2 the channels 38 in the second part register with the channels 30 in the first part of the holder.

Also in each channel 38 there is disposed a terminal piece in the form of a spring strip 41 which is of similar form to the spring strip 33 in an opposed channel 30 and which has at its inner end a portion bent in the direction towards the first part of the holder, such portion being indicated at 42. Each such spring strip 41 also has similar to the spring strip 33 lugs pressed out on opposite sides thereof to locate the spring strip 41 in its channel 38, as shown in FIGURE 2. The outer end of each spring strip 41 is electrically connected to an appropriate one of the leads 16 leading to the cartridge 15.

At its inner or forward end this second part of the holder has an enlarged nose piece 43 which has an inclined cam portion 44 adapted for co-operation with the spring wire 25 in the manner hereinafter described when the two parts of the holder are engaged together and in this position the body of the nose 43 is disposed in an aperture 45 in the base 25 of the first part of the holder. At its other end the base 25 has a portion which is of reduced transverse width, indicated at 46, and at the end of this portion a further reduced width portion providing a shoulder at each side, indicated at 47.

The two parts of the holder are assembled together to achieve the fully assembled position shown in FIGURE 2 by taking the second part of the holder with its attached cradle 21 carrying the cartridge 15 and presenting this to the first part of the holder in opposed face to face relationship and at a slight angle so that the shoulders 47 at the one end of the base of the second part of the holder can be engaged below the shoulders 27 at the end of the base of the first part of the holder and then the second part of the holder moved with a pivoting motion towards the first part of the holder so that the nose part 43 engages against the spring wire 29 to move this forwardly and allow the nose to snap into engagement and the inclined part 44 of the nose to be held by the spring wire 29 when it returns to its original position so that then, as shown in FIGURE 2, the two parts of the holder are held together in detachable relationship and to separate them it is only necessary to grasp the lugs 37 of the second part of the holder and move this part with a pivotal movement away from the first part so as to displace the spring wire 29 and then allow the shoulders 47 to be disengaged from below the shoulders 27 allowing the two parts to be completely separated.

As will be observed, when the two parts of the holder are in assembled relationship, as in FIGURE 2, the inclined parts 34 and 42 of the opposed terminal pieces are brought into resilient contact so as to achieve an electrical connection between each terminal piece 33 in the one part of the holder with its corresponding terminal piece 41 in the second part of the holder thus establishing electrical connection between the appropriate lead 16 from the cartridge and the appropriate lead 14 extending along the pick-up arm 10.

Thus by virtue of the planar construction and configuration of the two parts of the holder there is provided a detachable holder which takes up the minimum space in the housing at the end of the pick-up arm and as the two parts of a generally planar construction they can be easily and economically produced as mouldings in plastics material with the appropriate channels already formed for the reception of the terminal pieces. The opposed face to face relationship of the two parts of the holder when engaged provides for a simple and easy method of detachment of the cartridge from the pick-up arm and as the two parts of the holder are of rigid material and engage detachably together in a rigid fashion, the terminal pieces are ensured of making correct electrical connection each time and this eliminates the provision of the somewhat bulky pin and socket-like terminals which have been employed in holders previously proposed for detachable cartridges.

What I then claim is:

1. A holder for detachably mounting a cartridge having output terminals on the pick-up arm of a record player with electrical leads from the pick-up passing along the pick-up arm, said holder comprising:

(a) a first part of generally planar form for fixing to the pick-up arm and detachably connected in face to face relationship with (b) a second part, of generally planar form, on which the cartridge is detachably mounted (c) first electrical terminal pieces in said first part in the face thereof opposed to the second part and for connection with the electrical leads passing along the pick-up arm, (d) second electrical terminal pieces in said second part in the face thereof opposed to the first part and for connection with the output terminals of the cartridge, (e) said first and second terminal pieces being brought into electrical contact when the said two parts are assembled together in face to face relationship.

2. A holder according to claim 1 wherein the two parts of the holder are made as mouldings in plastics material and at least one of the parts has a resilient member for snap engagement by the other part whereby the two parts of the holder are constructed so as to have snap-in and snap-out engagement and disengagement respectively.

3. A holder according to claim 1 wherein each part of the holder has a substantially flat base in which are formed a plurality of channels extending in spaced parallel relationship longitudinally of the base and there being disposed in each channel a spring metal terminal piece having its inner end bent outwardly in the direction towards the other part of the holder and having its other and outer end electrically connected in the case of the first part of the holder to the leads extending through the pick-up arm, and in the case of the second part of the holder to the leads extending to the cartridge, the arrangement being that when the two parts of the holder are assembled together the outwardly bent ends of the terminal pieces in each part of the holder make electrical contact with their opposed terminal pieces in the other part of the holder.

4. A holder according to claim 1 wherein the one part of the holder has at its one end a transversely extending spring wire and at its other end spaced apart upstanding pillars, each having an undercut shoulder and wherein the other part of the holder has at its one end a projecting nose and at its other end transversely extending shoulders, the arrangement being that when the two parts are assembled together the said transversely extending shoulders of the one part engage below the undercut shoulders of the other part and the projecting nose on the one part engages with a snap action with the transversely extending spring wire on the other part.

5. A holder according to claim 1 wherein the second part of the holder has detachably secured thereto a cradle formed of spring metal strip and having at its forward and rear ends outwardly extending arms with which projections on the forward and rear ends of the cartridge are detachably engaged.

References Cited

UNITED STATES PATENTS

| | | | |
|---|---|---|---|
| 3,387,849 | 6/1968 | Dally | 274—24 |
| 3,235,673 | 2/1966 | Wiggins et al. | 179—100.41 |
| 3,224,783 | 12/1965 | Wiggins et al. | 274—24 |
| 3,139,284 | 6/1964 | Hammond | 274—24 |
| 2,557,176 | 6/1951 | Cranmer | 274—24 |

LEONARD FORMAN, *Primary Examiner.*

F. J. D'AMBROSIO, *Assistant Examiner.*